(12) United States Patent
Rakic et al.

(10) Patent No.: US 7,325,161 B1
(45) Date of Patent: Jan. 29, 2008

(54) CLASSIFICATION OF RECOVERY TARGETS TO ENABLE AUTOMATED PROTECTION SETUP

(75) Inventors: Branka Rakic, Maple Grove, MN (US); Steven Kappel, Savage, MN (US); Guido Westenberg, Minneapolis, MN (US); Shelley A. Schmokel, Prior Lake, MN (US); Nancy L. Bayer, Arden Hills, MN (US); Peter A. Barber, Woking (GB); Julianne M. Urban, Stillwater, MN (US)

(73) Assignee: Symantec Operating Corporation, Mountain View, CA (US)

( * ) Notice: Subject to any disclaimer, the term of this patent is extended or adjusted under 35 U.S.C. 154(b) by 639 days.

(21) Appl. No.: 10/881,033

(22) Filed: Jun. 30, 2004

(51) Int. Cl.
*G06F 11/00* (2006.01)
(52) U.S. Cl. ............................ 714/15; 714/5
(58) Field of Classification Search ............ 714/15, 714/20
See application file for complete search history.

(56) References Cited

U.S. PATENT DOCUMENTS

| | | | |
|---|---|---|---|
| 5,734,811 A * | 3/1998 | Croslin | 714/4 |
| 5,966,730 A | 10/1999 | Zulch | |
| 6,170,009 B1 | 1/2001 | Mandal et al. | |
| 6,295,611 B1 * | 9/2001 | Connor et al. | 714/20 |
| 6,430,703 B1 * | 8/2002 | Connor et al. | 714/20 |
| 6,459,682 B1 * | 10/2002 | Ellesson et al. | 370/235 |
| 6,507,561 B1 * | 1/2003 | Baniewicz et al. | 370/216 |
| 6,539,462 B1 * | 3/2003 | Mikkelsen et al. | 711/162 |

(Continued)

OTHER PUBLICATIONS

Office Action from U.S. Appl. No. 10/881,615, mailed Mar. 20, 2007.

(Continued)

*Primary Examiner*—Gabriel Chu
(74) *Attorney, Agent, or Firm*—Lawrence J. Merkel; Meyertons, Hood, Kivlin, Kowert & Goetzel, P.C.

(57) ABSTRACT

In one embodiment, a recovery manager may define a plurality of recovery target sets. Each recovery target set comprises a recovery point target, a recovery time target, and at least one other property. The recovery manager also defines a plurality of recovery classes. Each recovery class comprises at least one recovery target set of the plurality of recovery target sets. Each recovery class describes recovery requirements over an asset state life cycle. The recovery manager applies a first recovery class of the plurality of recovery classes to a first asset dependent on an importance of the first asset to an owner of the first asset. In some cases, the first recovery class and/or other recovery classes of the plurality of recovery classes may each be applied to multiple assets. In another embodiment, a recovery manager defines one or more recovery target sets to be applied to one or more assets and saves the one or more recovery target sets. In some embodiments, recovery classes are also saved.

40 Claims, 6 Drawing Sheets

U.S. PATENT DOCUMENTS

| | | | |
|---|---|---|---|
| 7,032,126 | B2 | 4/2006 | Zalewski et al. |
| 7,069,401 | B1* | 6/2006 | Noonan et al. ............. 711/162 |
| 7,082,463 | B1* | 7/2006 | Bradley et al. ............. 709/223 |
| 7,093,162 | B2* | 8/2006 | Barga et al. .................. 714/15 |
| 2002/0035706 | A1* | 3/2002 | Connor et al. ................ 714/15 |
| 2002/0049912 | A1 | 4/2002 | Honjo et al. |
| 2003/0005095 | A1* | 1/2003 | Fee ........................... 709/221 |
| 2003/0135609 | A1* | 7/2003 | Carlson et al. ............. 709/224 |
| 2003/0225800 | A1 | 12/2003 | Kavuri |
| 2003/0225801 | A1 | 12/2003 | Devarakonda et al. |
| 2004/0078334 | A1 | 4/2004 | Malcolm et al. |
| 2004/0243699 | A1* | 12/2004 | Koclanes et al. ........... 709/224 |
| 2005/0039069 | A1 | 2/2005 | Prahlad et al. |
| 2005/0066239 | A1* | 3/2005 | Keeton et al. ................ 714/47 |
| 2005/0102547 | A1 | 5/2005 | Keeton et al. |
| 2005/0262377 | A1 | 11/2005 | Sim-Tang |

OTHER PUBLICATIONS

IGG-03172004-01, C. Claunch, "Management Update: Best Practices in Business Continuity and Disaster Recovery," Artivle Mar. 17, 2004, Gartner, Inc., 13 pages.

Strategic Planning, SPA-21-3174, R. Paquet, C. DiCenzo, "Predicts 2004: Recovery Replaces Backup and Replication," Resaeach Note, Nov. 18, 2003, Gartner, Inc., 3 pages.

Dynamic Markets "Utility Computer: The CIO Squeeze?", Independent Market Research Repot commissioned by VERITAS, Sep. 2003, 151 pages.

Office Action from U.S. Appl. No. 10/881,220 mailed Jun. 21, 2007.

Kimberly Keeton, et al., "Automating Data Dependability," ACM-SIGOPS European Workship, Saint-Emilion, France, Sep. 2002, 8 pages.

Kimberly Keeton, et al., "Automatic Design of Dependable Data Storage Systems," Jun. 2003, 6 pages.

Office Action from U.S. Appl. No. 10/881,615, mailed Sep. 24, 2007.

* cited by examiner

Recovery Target (RT) Set

- Recovery Point Target (RPT)
- Recovery Time Target (RTT)
- Duration
- Robustness Properties
  - Number of Copies
  - Quality of Storage for Each Copy
  - Physical Location of Each Copy
  - ⋮

- Other Properties
  - Expense
  - Security Property
    - ☐ Encryption
    - ☐ Access Control

Recovery Class 1 - Critical 50

RT Set 1 56
RTT = 30 mins
RPT = <5 mins
Duration = 1st 24 Hours
Robustness = 1 Local Copy

RT Set 2 62
RTT = 24 hrs
RPT = <1 hr
Duration = 1st 7 Days
Robustness = 2 Local Copies

RT Set 3 66
RTT = 1 wk
RPT = <24 hrs
Duration = up to 3 Months
Robustness = 1 Remote Copy

Recovery Class 2 - Vital 52

RT Set 1 58
RTT = 8 hrs
RPT = 4 hrs
Duration = 1st 24 Hours
Robustness = 1 Local Copy

RT Set 2 64
RTT = 24 hrs
RPT = 1 day
Duration = 1st 7 Days
Robustness = 2 Local Copies

RT Set 3 68
RTT = 1 wk
RPT = <48 hrs
Duration = up to 3 Months
Robustness = 1 Remote Copy

Recovery Class 3 - Non-Vital 54

RT Set 1 60
RTT = 3 days
RPT = 1 day
Duration = 1st 24 Hours
Robustness = 1 Copy

RT Set 2 70
RTT = 1 wk
RPT = 1 day
Duration = up to 3 Months
Robustness = 1 Remote Copy

Fig. 5

CLASSIFICATION OF RECOVERY TARGETS TO ENABLE AUTOMATED PROTECTION SETUP

BACKGROUND OF THE INVENTION

1. Field of the Invention

This invention is related to the field of data protection and recovery for computer systems.

2. Description of the Related Art

Data protection for computer systems is an important part of ensuring that the information generated on a computer system and/or stored on the computer system is not lost due to the occurrence of a hardware failure, a software failure, user error, or other environmental event (e.g. power outage, natural disaster, intentionally-caused disaster, accidental disaster, etc.). Generally, events that the data protection scheme is designed to protect against are referred to herein as disaster events. The data protection scheme attempts to make redundant copies of the data and locate those copies such that the data is safe from the disaster events and such that the data can be restored to the computer system or to another computer system rapidly enough to be acceptable given the nature of the data, its importance to the creator of the data, etc.

Increasingly, organizations are adopting formal service level agreements (SLAs) with their information technology (IT) departments or third party IT providers. Disaster recovery planners (and/or business continuity planners) in the organization assign recovery requirements to various information assets based on the importance of the information assets to the continued functioning of the organization. Currently, the disaster recovery planners specify a recovery point objective (RPO) and a recovery time objection (RTO). The RPO indicates, relative to a specified point in time, how close in time that it must be possible to recover the state of the corresponding information asset. For example, an RPO of 0 indicates that is must be possible to recover the state of the information asset at any point in time. On the other hand, an RPO of 30 minutes indicates that is must be possible to recover the state of the information asset to a state within 30 minutes of the specified point in time. The RTO specifies the maximum amount of time that the recovery operation may take.

The RTO and RPO are objectives aligned to the organization's needs, but they may not actually be achievable given data protection technology, budgetary constraints, etc. Accordingly, corresponding recovery targets (recovery time target (RTT) and recovery point target (RPT)) are negotiated by the disaster recovery planners with the IT department/provider. The RTT and the RPT are formalized as the SLA. Typically, SLAs only cover the immediate recovery of the current state of an asset in response to a disaster event.

Once the SLAs are in place, the IT department/provider must then establish a protection scheme for the information assets that will meet the SLA. There are myriad protection schemes and protection products available which may provide pieces of an overall protection solution that would meet an SLA. However, the number of combinations and permutations of schemes is dauntingly large. Additionally, protection schemes and products are typically focused on the protection provided, not on the recovery metrics that may be achievable using the schemes/products to recover from a disaster event. Thus, it is difficult to determine a protection scheme that may meet a given SLA.

SUMMARY OF THE INVENTION

In one embodiment, a recovery manager may define a plurality of recovery target sets. Each recovery target set comprises a recovery point target, a recovery time target, and at least one other property. The recovery manager also defines a plurality of recovery classes. Each recovery class comprises at least one recovery target set of the plurality of recovery target sets. Each recovery class describes recovery requirements over an asset state life cycle. The recovery manager applies a first recovery class of the plurality of recovery classes to a first asset dependent on an importance of the first asset to an owner of the first asset. In some cases, the first recovery class and/or other recovery classes of the plurality of recovery classes may each be applied to multiple assets.

In another embodiment, a recovery manager defines one or more recovery target sets to be applied to one or more assets. Each recovery target set comprises a recovery point target, a recovery time target, and at least one other property. The recovery manager saves the one or more recovery target sets (e.g. for subsequent application to assets).

BRIEF DESCRIPTION OF THE DRAWINGS

The following detailed description makes reference to the accompanying drawings, which are now briefly described.

FIG. 2 is a diagram illustrating one embodiment of a recovery target set.

FIG. 5 is a block diagram illustrating an exemplary set of recovery class definitions.

Figure 1:
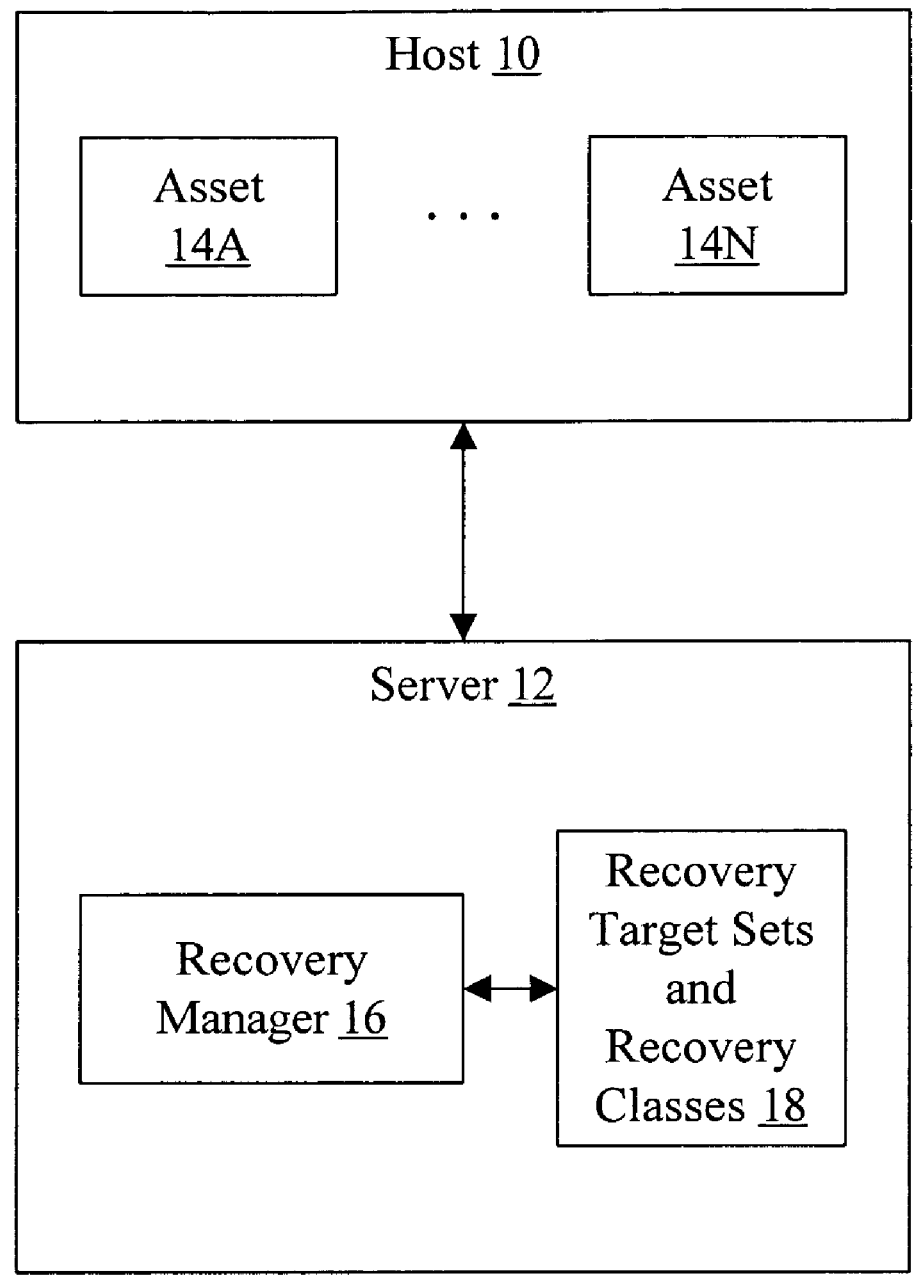
FIG. 1 is a block diagram of one embodiment of a host and a server.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram is shown illustrating one embodiment of a host 10 and a server 12. The host 10 is coupled to the server 12. The host 10 includes one or more assets (e.g. assets 14A-14N in FIG. 1). In the illustrated embodiment, the server 12 includes a recovery manager 16. In the illustrated embodiment, the server also includes recovery target sets (RT sets) and recovery classes 18.

Generally, the assets 14A-14N are each an entity of computer system data and/or functionality on the host 10 that is to be protected such that it can be recovered after a disaster event. In the context of an asset, computer system data is being used in its generic sense to refer to both data and instruction code, in general, although a given asset may comprise only data or only instruction code. In some cases, a given asset 14A-14N may be a "physical" asset (e.g. a file, the data on a volume or on a physical disk, the data comprising a server, etc.). In other cases, a given asset may be a "logical" asset which groups together two or more assets. The assets comprising a logical asset are referred to as component assets. Component assets may be physical assets, or may themselves be logical assets in some embodiments. For example, an application environment may be a logical asset and may comprise one or more of the application itself, various configuration files for the application, various data files created by and/or used by the application, the volume(s) and/or file system(s) used by the application, the in-memory state of the application if the application is executing, one or more web servers that interface with the application, etc. As a more specific example, the logical asset may be an SAP AG application and the component assets may include the application, one or more underlying databases, one or more web servers, configuration and data files, and in-memory state. In some cases, an asset may span multiple computer systems. That is, portions of the asset may reside on different computer systems.

The recovery manager 16 comprises software configured to define one or more RT sets. Each RT set comprises properties describing the desired recoverability of the asset(s) to which the RT set is subsequently applied. For example, in the present implementation, each RT set comprises a recovery point target (RPT), a recovery time target (RTT), and one or more other properties. The RTT specifies the maximum amount of time that the process of recovering the asset may take. The RPT is specified relative to a selected point in time at which the state of the asset is desired to be recovered. Specifically, the RPT specifies the amount of time relative to the selected point in time within which a state of the asset is to be recoverable. That is, a state corresponding to a point in time within the RPT of the selected point in time is to be recoverable. The RPT may thus be viewed as a measure of acceptable data loss. In many recoveries, the selected point may be the time at which the disaster event occurred. In other cases, the selected point may be a point in the past (e.g. prior to a virus infection, or a defined point in time for recovery for legal/regulatory reasons).

The other properties of the RT set may be defined to assist in automated setup of a protection plan for the assets to be associated with the RT set. The RPT and RTT may assist in the automated setup as well. Generally, a protection plan may comprise one or more protection methods that are configured to protect a given asset. Protection methods may include, for example, clustering, backup, replication, snapshot, and/or vaulting. By providing additional properties in the RT set, the selection of various protection methods (and configurations of the protection methods, such as the frequency of activating the protection method, the media used in the protection method, etc.) may be automated by permitting the ranking of the various methods according to their ability to meet the additional properties. For example, the various methods may, in some implementations, be parameterized according to the properties. By analyzing the parameterization in view of the properties of an RT set, the ability of the method to meet the RT set properties may be estimated. Some methods may be eliminated from consideration due to their inability to meet one or more of the RT set properties. The remaining methods may be ranked according to their abilities to meet the properties. For example, a score for each of the remaining methods may be calculated. In some embodiments, the method having the best score may be selected.

In some embodiments, RT sets may be directly applied to assets 14A-14N. In other embodiments, the recovery manager 16 may be configured to define one or more recovery classes. Each recovery class includes one or more RT sets. In one embodiment, the recovery classes may be applied to the assets 14A-14N to define recovery requirements over the life cycle of the assets 14A-14N. Particularly, at any given time, the asset may have a state. The life cycle may define the life cycle of the asset state, from creation of the state until the state is no longer needed as defined by the recovery class applied to the asset. Different recovery classes may be defined for application to assets dependent on the importance of the assets to the owner of the assets (e.g. the organization that owns the host 10, such as a business enterprise). That is, each recovery class may represent a different level of importance. A given asset's importance to the organization may be determined, and the recovery class corresponding to that level of importance may be applied to the given asset. The recovery requirements of the given asset state over its life cycle are described by the recovery class applied to the given asset. Protection methods may be configured for the given asset to meet the recovery requirements indicated by the recovery class applied to the given asset.

Additionally, using multiple RT sets in a recovery class to define the recovery requirements over the asset state life cycle may permit the recovery requirements to change as an asset state ages. For example, the recovery requirements early in the asset state life cycle may be more stringent (and thus typically more costly to implement in terms of resources consumed to implement the protection methods), to permit rapid recovery with little data loss in response to a disaster event. On the other hand, recovery requirements later in the asset state life cycle may be governed by the safety of the asset copied and/or legal/regulatory requirements. It may be acceptable for the recovery time to be much longer, and the recovery point may also be larger (e.g. measured in days or weeks rather than minutes or hours). Different RT sets may specify the more and less stringent recovery requirements (or simply the different recovery requirements) at the different points in the asset state life cycle, permitting less costly protection methods to be employed as an asset state ages and/or permitting more appropriate protection methods to be employed.

In some embodiments, the grouping of RT sets into a recovery class may permit the optimization of protection methods across the recovery class. A first protection method/configuration may appear to be desirable when one RT set is viewed in isolation. However, given other RT sets in the recovery class that may apply at different points in the life cycle of the asset state, a different protection method/configuration may actually be more desirable for the asset state life cycle as a whole. For example, if a replication method is selected to meet the properties of a first RT set, and tape backup is selected for a second RT set, the tape backup may take advantage of the replication and make the backup from the replica rather than locally. In some embodiments employing the parameterization mentioned above, the parameters of the potential methods for each RT set may be compared to each other to identify possible optimizations. That is, the closer that parameters of a method for one RT set match the parameters of a method that may be selected for another RT set, the more likely that the two methods may be a more optimal selection for the recovery class as a whole.

RT sets and recovery classes may be defined prior to the existence of the assets 14A-14N, in some cases, and may reflect input from disaster recovery planners and IT administrators responsible for implementing data protection and recovery. The recovery classes may then be applied to the assets 14A-14N. Additionally, as new assets are acquired or created, a recovery class may be applied to the new assets based on their importance. Similarly, if assets change in importance, the applied recovery class may be changed.

In various embodiments, there may be at least one recovery class defined and, in some embodiments, multiple recovery classes are defined. Each recovery class may include at least one RT set and, in some embodiments, various recovery classes include multiple RT sets.

The host 10 comprises one or more computer systems that store and/or manipulate and/or execute the assets 14A-14N. In some cases, external storage such as network attached storage (NAS) or storage area network (SAN) storage may store some of the assets 14A-14N, and the host 10 may comprise the NAS/SAN storage as well.

In the illustrated embodiment, the server 12 executes the recovery manager 16. Generally, the server 12 comprises software that may be executed on a computer system. In some embodiments, the server 12 may be executed on a separate computer system from those in the host 10. In such embodiments, the computer system executing the server 12 may be configured to communicate with the computer system(s) in the host 10 (e.g. via a network). In other embodiments, the server 12 may be executed on a computer system in the host 10. Additionally, some embodiments may include no servers (that is, the recovery manager 16 may be executed on the host 10). In still other embodiments, the recovery manager 16 may be executed on another computer system that has no server relationship to the host 10 (e.g. on an administrator's computer system).

In various embodiments, user input may be accepted (e.g. to provide values for the RT sets, to arrange RT sets into recovery classes, to select recovery classes to apply to assets, etc.). User input may be provided to the recovery manager 16 in any desired fashion. Generally, the computer system that is executing the recover manager 16 may have one or more user input devices such as a keyboard, a mouse or other pointing device, voice input, touch screen, etc. The user may provide user input via the user input devices.

FIG. 2 is a diagram illustrating one embodiment of the contents of an RT set. Other embodiments may implement different RT sets which may include additional properties, or which may include any subset of the properties shown in FIG. 2, or which may include any subset and additional properties, as desired. As mentioned above, the RT set may include the RPT and RTT. The RPT and the RTT may typically correspond to the RPT and RTT specified in an SLA, for example.

A duration property is shown in FIG. 2. The duration property may specify a time interval over which the RT set applies to the asset. For example, the duration property may be measured relative to the age of the asset. In some embodiments, the duration property may specify the end of the time interval (e.g. first 24 hours, first seven days, etc.). In other embodiments, both the start and the end of the time interval may be specified (e.g. after the first 24 hours and within the first seven days, etc.).

A robustness property (or subset of properties) may also be included in an RT set. Generally, the robustness property may specify various aspects of a protection method that indicate how resilient the protection is as compared to various disaster events. That is, a protection method may be more robust if it is immune to more disaster events (that is, if recovery using the protection method is possible for more disaster events). For example, robustness properties may specify the number of copies to be made of an asset. As another example, the quality of the storage for each copy may be specified. The quality of storage may be measured in a variety of ways. For example, if local disk storage is used, the quality of storage may specify hardware protection methods for the disk such as redundant array of inexpensive disks (RAID) levels. If tape media or other removable media is used, quality may be measured in terms of the number of times the media has been written and/or its age. Another example may be the physical location of each copy. The physical location may be a specific location, or may indicate a third party method such as vaulting. In other cases, the physical location may be specified relative to the source asset. For example, the physical location may be specified in terms of distance from the source asset, or in a more qualitative sense relative to the source asset such as off host, off campus, or third party. Additional levels of qualitative granularity may be provided (e.g. off host but on the same floor as the host, or off the same floor but in the same building, etc.). In yet other embodiments, physical location may be specified as local or remote, where local and remote may be defined separately (e.g. by the administrator, based on how the organization is organized, available remote sites, etc.). Other robustness properties may be defined in other embodiments (as indicated by the ellipses in FIG. 2).

Various other properties may be included in an RT set, in various embodiments. For example, an expense property may be included. The expense property may indicate the desired expense (cost) characteristics of the selected protection method. In various embodiments, the expense property may be specified in different ways. For example, the expense property may specify whether or not minimizing expense is desired (e.g. by minimizing the resources expended to implement the protection method). In another example, the expense property may be a qualitative measure (e.g. high, medium, low). In yet another example, the expense property may be an order of magnitude indication approximating the desired maximum expense. Various potential protection methods may be ranked based on their ability to meet the expense property.

In some embodiments, a security property may be included in the RT set. The security property may generally specify mechanisms to prevent unauthorized access to/use of the asset. For example, the security property may include an encryption property that may specify whether or not encryption is desired. Alternatively or additionally, the encryption property may specify the type of encryption to be used. In some cases, the encryption type may be specified via law or regulation (e.g. the health insurance portability and accountability act of 1996, or HIPAA, provides strong medical record privacy rights and thus encryption would be required for third party storage of patient medical records). Again, various potential protection methods may be ranked based on their ability to meet the encryption property. The security property may include an access control property that specifies the extent to which access is granted to various users. For example, the access control property may list users and the access permitted, may control access according to user membership in various predefined groups, etc.

As indicated by the second ellipses in FIG. 2, various other properties may be included in other embodiments, as desired.

It is noted that, in some embodiments, the RT set may also support weighting factors for each property, to permit some programmability of the importance of meeting the various properties. Alternatively, the recovery manager 16 may support programmable weighting of the properties.

The properties included in a given RT set may be used to assist in the automated configuration of protection plans, as mentioned above. First, the properties may be used to eliminate potential protection methods that do not meet one or more of the properties. If more than one protection method might meet the RT set properties, the properties may be used to rank the protection methods. The best-ranking protection method (or a combination of protection methods) may be selected for inclusion in the protection plan. Additionally, various configuration data for the selected method(s) may be derived from the RT set. For example, the RPT may indicate the minimum frequency at which asset copies are made. The robustness properties may indicate various configuration settings to achieve the desired robustness. The encryption properties may indicate the encryption requirements.

Figure 3:
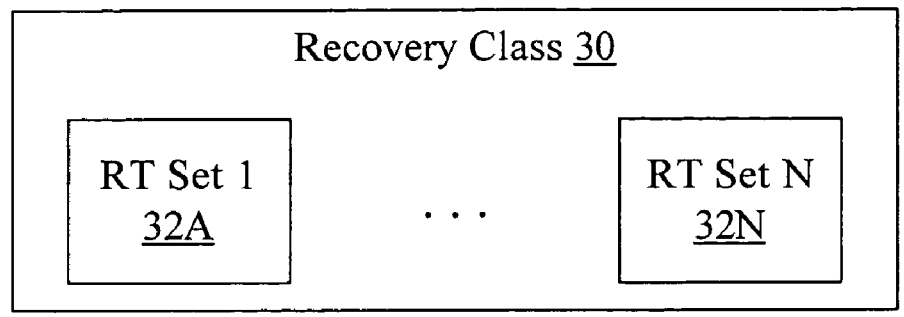
FIG. 3 is a block diagram illustrating one embodiment of a recovery class including multiple recovery target sets.

FIG. 3 is a block diagram that diagrammatically illustrates one embodiment of a recovery class 30. The recovery class 30 is a set of at least one RT set, and may include multiple RT sets (e.g. RT sets 32A-32N in FIG. 3). The actual representation of the recovery class in the data structures (e.g. reference numeral 18) may be any desired representation.

In some embodiments, a recovery class 30 may also include a resource type constraint. The resource type constraint may be used to exclude certain resources from use in the protection methods, or alternatively to require that certain resources be used. In some embodiments, a recovery class 30 may also include an asset type constraint that may be used to constrain a recovery class to be used for one or more asset types (e.g. an asset type may be a database, or a specific vendor's database). The asset type constraint may be used to restrict the selected protection methods to those that will work with the specified asset type. In still other embodiments, both the resource type constraint and the asset type constraint may be included in a recovery class 30.

Figure 4:
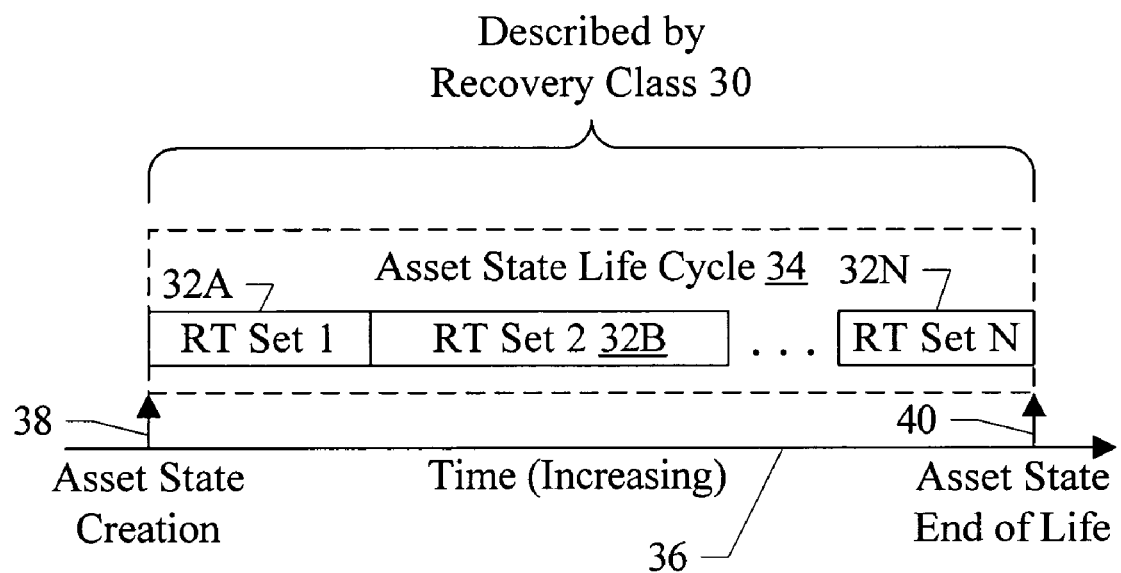
FIG. 4 is a block diagram illustrating an asset state life cycle and describing the protection requirements with an exemplary recovery class that includes multiple recovery target sets.

FIG. 4 is a block diagram illustrating the use of recovery class 30 to describe an asset state life cycle 34. The asset state life cycle 34 is illustrated as an interval of time (time is increasing toward the right in FIG. 4, as indicated by the arrow 36). The asset state life cycle 34 starts at asset state creation (arrow 38) and continues until asset state end of life (arrow 40). Asset state creation may refer to the state of the asset at a given point in time. In some embodiments, the asset state creation may correspond to the time at which a copy of the asset is made according to the protection methods implemented for the recovery class. In other embodiments, the asset state creation may be the point in time prior to the copy being made at which the last change to the asset state occurred. Asset state end of life may be the point at which the asset state is no longer needed. Within the asset state life cycle 34, the RT sets defined in the recovery class 30 are shown. Particularly, in FIG. 4, the RT set 32A specifies the recovery requirements for the early part of the life cycle 34. An RT set 32B specifies the recovery requirements for the next portion of the life cycle 34 after the portion specified by the RT set 32A, and the RT set 32N defines the recovery requirements to the end of the life cycle 34. Additional RT sets (not shown in FIG. 4) may specify the recovery requirements for the portion of the life cycle 34 between the RT set 32B and the RT set 32N, in some embodiments. For the embodiment of RT sets shown in FIG. 2, the duration property may specify which portion of the life cycle 34 is governed by a given RT set.

Each RT set 32A-32N may exist for a different period of time with the life cycle 34. For example, in the FIG. 4, the RT set 32B is shown covering a longer portion of the life cycle 34 than the RT sets 32A or 32N. Grouping RT sets into a recovery class and applying the recovery class to the asset may help to ensure that each part of the asset life cycle is covered (i.e. that there are no gaps in the protection of the asset).

While the life cycle 34 illustrates the life cycle of one state of the asset, typically there are many asset states as time moves forward. Thus, at any point in time, there may be many states at different points in the life cycle 34.

FIG. 5 is an example of a set of recovery class definitions that might be used in an exemplary organization for the organization's assets. FIG. 5 is merely an example meant to illustrate the use of recovery classes.

In the example of FIG. 5, three recovery classes are illustrated (reference numerals 50, 52, and 54). The first recovery class (reference numeral 50) is labeled "critical". Similarly, the second recovery class (reference numeral 52) is labeled "vital" and the third recovery class (reference numeral 54) is labeled "non-vital". The critical recovery class 50 may be used for the assets accorded the highest importance by the organization. The vital recovery class 52 may be used for assets that are not as important as the assets in the critical recovery class 50 but still of high importance. The non-vital recovery class 54 may be used for less important assets.

As mentioned previously, the importance of an asset is usually its importance to the continuing operation of the business or other activity in which the organization is engaged. The importance may be a relative measure, or a measure of degree, among the recovery classes. That is, assets assigned the highest level of importance, corresponding to the critical recovery class 50 in this example, may be the assets for which recovery in the shortest possible period is needed for continuing operation. Assets assigned the next highest level of importance, corresponding to the vital recovery class 52, may be recovered somewhat more slowly than the assets in the critical recovery class 50 but are still needed fairly quickly for continued operation. Finally, assets corresponding to the non-vital recovery class 54 may be not needed for extended periods and thus may be recovered at a still slower pace than assets in the classes 50 and 52.

Reflecting the above divisions, the first RT set in each class 50, 52, and 54 (reference numerals 56, 58, and 60, respectively) reflect increasing RTTs. The RTT in the RT set 56 is 30 minutes, while the RTT in the RT set 58 is 8 hours and the RTT in the RT set 60 is 3 days. Additionally, in this example, the RPT in the RT sets 56, 58, and 60 increases as the relative level of importance decreases (i.e. less than 5 minutes, 4 hours, and 1 day in this example).

The RT sets 56, 58, and 60 in this example cover the first 24 hours, as indicated by their respective durations. The recovery classes 50 and 52, being used for more important assets, include a second RT set to cover the first 7 days (reference numerals 62 and 64, respectively) and a third RT set to cover up to 3 months (reference numerals 66 and 68, respectively). The second RT sets 62 and 64 lengthen the RTT and RPT as compared to the respective first RT sets 56 and 58. However, the RTT and RPT are still fairly short compared to the third RT sets 66 and 68. The second RT sets 62 and 64 might be used, e.g., for recovery from a larger-scope disaster event than the first RT sets 56 and 58 with higher potential data loss (due to the higher RPT). Thus, the robustness of the second RT sets 62 and 64 may be higher than the first RT sets 56 and 58. The third RT sets 66 and 68 may be provided to satisfy legal/regulatory requirements, for example. Since the non-vital recovery class 54 is considered of lower importance, the second RT set 70 for the non-vital recovery class may cover the period up to 3 months.

In this example, the life cycle of asset states may be up to 3 months. If a longer life cycle were desired, the duration of the last RT set in each recovery class 50, 52, and 54 may be lengthened or one or more additional RT classes could be included in each recovery class 50, 52, and 54. Furthermore different recovery classes may specify life cycles that are of different lengths. For example, critical assets (recovery class 50) may have longer life cycles than vital assets (recovery class 52), which may have longer life cycles than non-vital assets (recovery class 54).

Figures 6, 7:
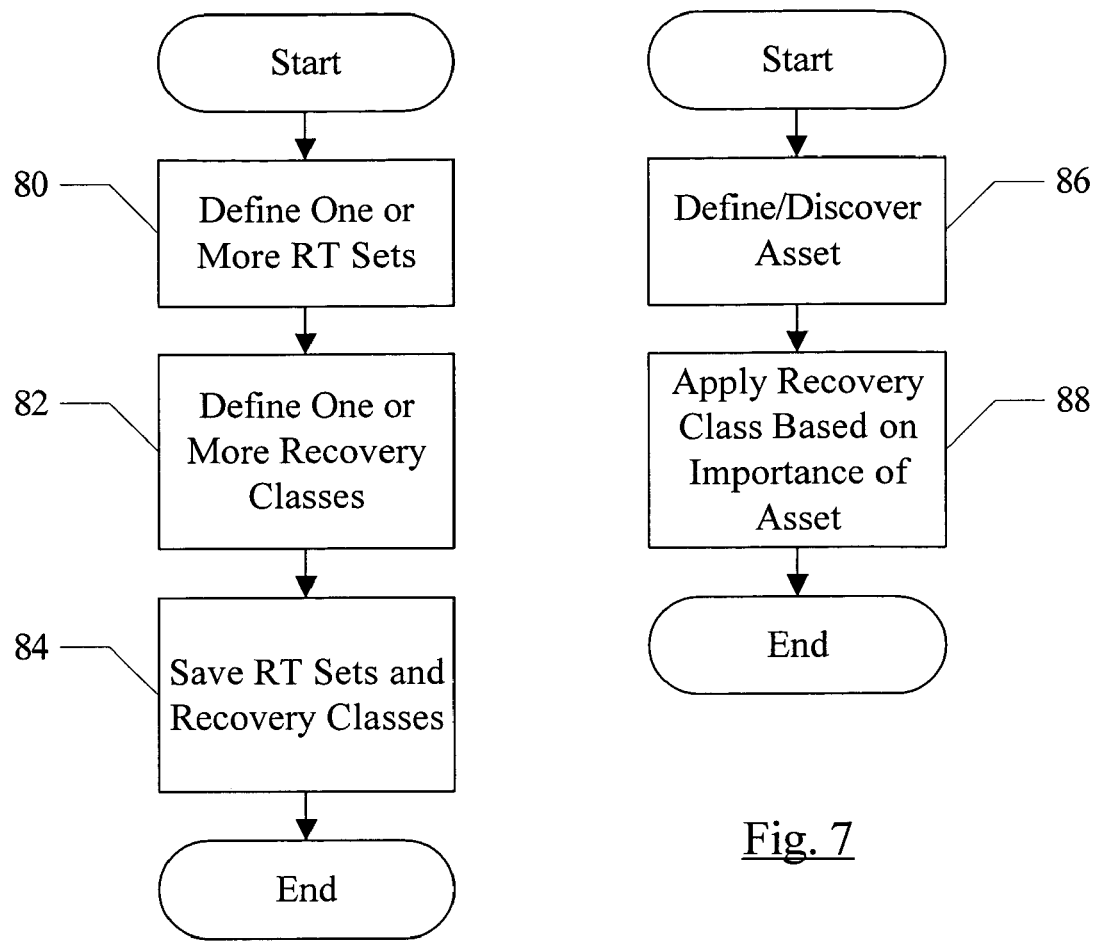
FIG. 6 is a flowchart illustrating one embodiment of defining recovery target sets and recovery classes.
FIG. 7 is a flowchart illustrating one embodiment of applying recovery classes to assets.

Turning next to FIG. 6, a flowchart is shown illustrating operation of one embodiment of the recovery manager 16 for defining RT sets and/or recovery classes. The recovery manager 16 may comprise instructions which, when executed, implement the operation shown in FIG. 6.

The recovery manager 16 may define one or more RT sets (block 80). The RT sets may be defined responsive to user input specifying the various values included in each RT set, for example. The recovery manager 16 may further define one or more recovery classes (block 82). Each recovery class may include one or more of the RT sets. Again, user input may specify the recovery classes, in some embodiments. The recovery manager 16 may save the defined RT sets and recovery classes (e.g. in the data structure 18 shown in FIG. 1) for subsequent application to assets (block 84).

The operation of FIG. 6 may be invoked at any time to define additional RT sets and/or recovery classes, as desired. For example, if disaster recovery plans are changed, additional RT sets and/or recovery classes may be needed. Additionally, as organizations grow or change, RT sets and/or recovery classes may change as well. Furthermore, if legal/regulatory requirements change, additional RT sets and/or recovery classes may be needed to meet the new requirements.

Turning next to FIG. 7, a flowchart is shown illustrating operation of one embodiment of the recovery manager 16 for defining an asset and apply a recovery class to the asset. The recovery manager 16 may comprise instructions which, when executed, implement the operation shown in FIG. 7.

The asset may be defined (block 86). Alternatively, the asset may be discovered. For example, an application may be discovered by an intelligent agent. Two or more assets (discovered or defined) may be grouped into a logical asset. Additionally, one of the recovery classes may be applied to the asset (block 88). The recovery class selected for the asset may be based on the importance of the asset to the organization, for example. The operation of FIG. 7 may be invoked at any time than an asset is defined (created) and/or discovered.

Figure 8:
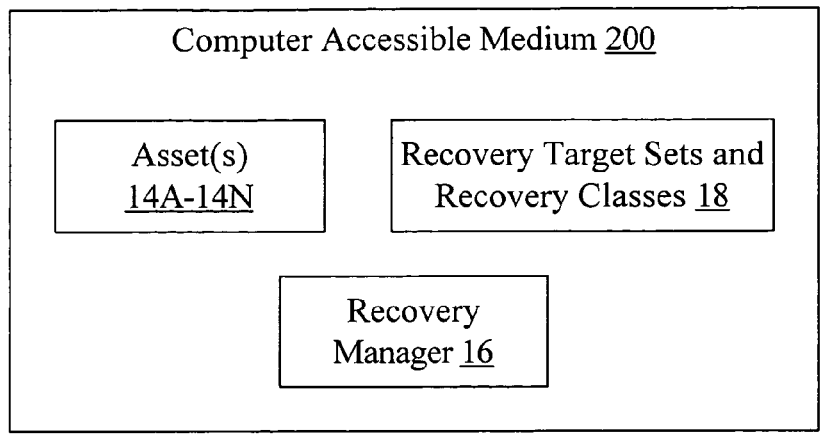
FIG. 8 is a block diagram of one embodiment of a computer accessible medium.

Turning now to FIG. 8, a block diagram of a computer accessible medium 200 is shown. Generally speaking, a computer accessible medium may include any media accessible by a computer during use to provide instructions and/or data to the computer. For example, a computer accessible medium may include storage media such as magnetic or optical media, e.g., disk (fixed or removable), tape, CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link. The computer accessible medium 200 in FIG. 8 may be encoded with one or more of the assets 14A-14N, the recovery target sets and recovery classes 18, and/or the recovery manager 16. The recovery manager 16 may each comprise instructions which, when executed, implement the operation described herein for the recover manager 16. Generally, the computer accessible medium 200 may store any set of instructions which, when executed, implement a portion or all of the flowcharts shown in one or more of FIGS. 6 and 7.

Figure 9:
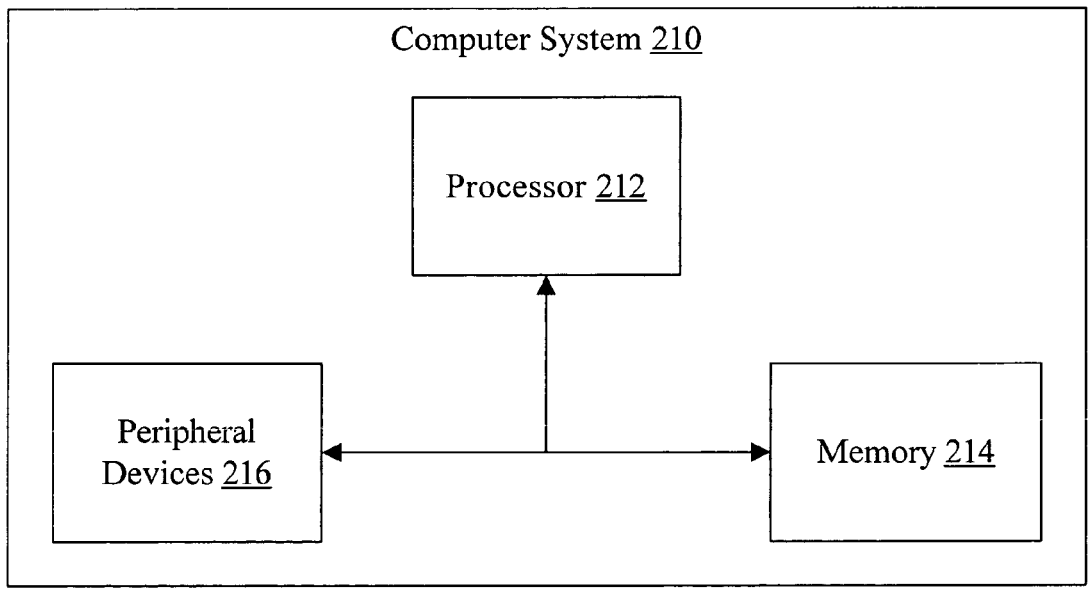
FIG. 9 is a block diagram of one embodiment of a computer system.

FIG. 9 is a block diagram of one embodiment of an exemplary computer system 210. In the embodiment of FIG. 9, the computer system 210 includes a processor 212, a memory 214, and various peripheral devices 216. The processor 212 is coupled to the memory 214 and the peripheral devices 216.

The processor 212 is configured to execute instructions, including the instructions in the software described herein. In various embodiments, the processor 212 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, the computer system 210 may include more than one processor.

The processor 212 may be coupled to the memory 214 and the peripheral devices 216 in any desired fashion. For example, in some embodiments, the processor 212 may be coupled to the memory 214 and/or the peripheral devices 216 via various interconnect. Alternatively or in addition, one or more bridge chips may be used to coupled the processor 212, the memory 214, and the peripheral devices 216.

The memory 214 may comprise any type of memory system. For example, the memory 214 may comprise DRAM, and more particularly double data rate (DDR) SDRAM, RDRAM, etc. A memory controller may be included to interface to the memory 214, and/or the processor 212 may include a memory controller. The memory 214 may store the instructions to be executed by the processor 212 during use (including the instructions implementing the software described herein), data to be operated upon by the processor 212 during use, etc.

Peripheral devices 216 may represent any sort of hardware devices that may be included in the computer system 210 or coupled thereto (e.g. storage devices, optionally including a computer accessible medium 200, other input/output (I/O) devices such as video hardware, audio hardware, user interface devices, networking hardware, etc.).

Numerous variations and modifications will become apparent to those skilled in the art once the above disclosure is fully appreciated. It is intended that the following claims be interpreted to embrace all such variations and modifications.

What is claimed is:

1. A method comprising:
defining a plurality of recovery target sets, wherein each recovery target set comprises a recovery point target, a recovery time target, and at least one other property, wherein the recovery time target specifies a maximum amount of time that can elapse during a recovery of an asset, and wherein the recovery point target specifies a maximum difference between a desired recovery time point and a time point for which a state of the asset is available for recovery;
defining a plurality of recovery classes, wherein each recovery class comprises at least one recovery target set of the plurality of recovery target sets, and wherein each recovery class describes recovery requirements over an asset state life cycle; and
applying a first recovery class of the plurality of recovery classes to a first asset dependent on an importance of the first asset to an owner of the first asset.

2. The method as recited in claim 1 wherein at least one recovery class of the plurality of recovery classes comprises at least two recovery target sets of the plurality of recovery target sets.

3. The method as recited in claim 2 wherein each of the at least two recovery target sets applies to different time intervals within the asset state life cycle.

4. The method as recited in claim 1 wherein the at least one other property comprises a duration over which the recovery target set applies.

5. The method as recited in claim 1 wherein the at least one other property comprises a robustness property.

6. The method as recited in claim 5 wherein the robustness property comprises a number of copies of the asset.

7. The method as recited in claim 5 wherein the robustness property comprises a quality of storage to be used for asset copies.

8. The method as recited in claim 5 wherein the robustness property comprises a location for one or more asset copies.

9. The method as recited in claim 1 wherein the at least one other property comprises an expense.

10. The method as recited in claim 1 wherein the at least one other property comprises a security property for the asset.

11. A method comprising:
defining a plurality of recovery target sets, wherein each recovery target set comprises a recovery point target, a recovery time target, and at least one other property;
defining a plurality of recovery classes, wherein each recovery class comprises at least one recovery target set of the plurality of recovery target sets, and wherein each recovery class describes recovery requirements over an asset state life cycle;
applying a first recovery class of the plurality of recovery classes to a first asset dependent on an importance of the first asset to an owner of the first asset; and
applying the first recovery class to a second asset.

12. A computer accessible storage medium storing a plurality of instructions including instructions which, when executed:
define a plurality of recovery target sets, wherein each recovery target set comprises a recovery point target, a recovery time target, and at least one other property, wherein the recovery time target specifies a maximum amount of time that can elapse during a recovery of an asset, and wherein the recovery point target specifies a maximum difference between a desired recovery time point and a time point for which a state of the asset is available for recovery;
define a plurality of recovery classes, wherein each recovery class comprises at least one recovery target set of the plurality of recovery target sets, and wherein each recovery class describes recovery requirements over an asset state life cycle; and
apply a first recovery class of the plurality of recovery classes to a first asset dependent on an importance of the first asset to an owner of the first asset.

13. The computer accessible storage medium as recited in claim 12 wherein at least one recovery class of the plurality of recovery classes comprises at least two recovery target sets of the plurality of recovery target sets.

14. The computer accessible storage medium as recited in claim 13 wherein each of the at least two recovery target sets applies to different time intervals within the asset state life cycle.

15. The computer accessible storage medium as recited in claim 12 wherein the at least one other property comprises a duration over which the recovery target set applies.

16. The computer accessible storage medium as recited in claim 12 wherein the at least one other property comprises a robustness property.

17. The computer accessible storage medium as recited in claim 16 wherein the robustness property comprises a number of copies of the asset.

18. The computer accessible storage medium as recited in claim 16 wherein the robustness property comprises a quality of storage to be used for asset copies.

19. The computer accessible storage medium as recited in claim 16 wherein the robustness property comprises a location for one or more asset copies.

20. The computer accessible storage medium as recited in claim 12 wherein the at least one other property comprises an expense.

21. The computer accessible storage medium as recited in claim 12 wherein the at least one other property comprises a security property for the asset.

22. A computer system comprising the computer accessible storage medium as recited in claim 12 and a processor coupled to the computer accessible storage medium and configured to execute the plurality of instructions.

23. A computer accessible storage medium storing a plurality of instructions including instructions which, when executed:
define a plurality of recovery target sets, wherein each recovery target set comprises a recovery point target, a recovery time target, and at least one other property;
define a plurality of recovery classes, wherein each recovery class comprises at least one recovery target set of the plurality of recovery target sets, and wherein each recovery class describes recovery requirements over an asset state life cycle;
apply a first recovery class of the plurality of recovery classes to a first asset dependent on an importance of the first asset to an owner of the first asset; and
apply the first recovery class to a second asset.

24. A method comprising:
defining one or more recovery target sets to be applied to one or more assets, wherein each recovery target set comprises a recovery point target, a recovery time target, and at least one other property, wherein the recovery time target specifies a maximum amount of time that can elapse during a recovery of an asset, and wherein the recovery point target specifies a maximum difference between a desired recovery time point and a time point for which a state of the asset is available for recovery; and saving the one or more recovery target sets.

25. The method as recited in claim 24 wherein the at least one other property is defined to assist in automated setup of a protection plan for one or more assets to which the recovery target set is subsequently applied.

26. The method as recited in claim 25 wherein the at least one other property comprises a robustness property.

27. The method as recited in claim 25 wherein the at least one other property comprises a duration over which the recovery target set applies.

28. The method as recited in claim 25 wherein the at least one other property comprises an expense.

29. The method as recited in claim 25 wherein the at least one other property comprises a security property for the asset.

30. The method as recited in claim 24 further comprising defining one or more recovery classes, wherein each recovery classes comprises at least one of the one or more recovery target sets; and saving the one or more recovery classes.

31. The method as recited in claim 30 further comprising selecting a first recovery class of the one or more recovery classes and applying the first recovery class to a first asset.

32. A computer accessible storage medium storing a plurality of instructions including instructions which, when executed:

define one or more recovery target sets to be applied to one or more assets, wherein each recovery target set comprises a recovery point target, a recovery time target, and at least one other property, wherein the recovery time target specifies a maximum amount of time that can elapse during a recovery of an asset, and wherein the recovery point target specifies a maximum difference between a desired recovery time point and a time point for which a state of the asset is available for recovery; and save the one or more recovery target sets.

33. The computer accessible storage medium as recited in claim 32 wherein the at least one other property is defined to assist in automated setup of a protection plan for one or more assets to which the recovery target set is subsequently applied.

34. The computer accessible storage medium as recited in claim 32 wherein the at least one other property comprises a robustness property.

35. The computer accessible storage medium as recited in claim 32 wherein the at least one other property comprises a duration over which the recovery target set applies.

36. The computer accessible storage medium as recited in claim 32 wherein the at least one other property comprises an expense.

37. The computer accessible storage medium as recited in claim 32 wherein the at least one other property comprises a security property for the asset.

38. The computer accessible storage medium as recited in claim 32 wherein the instructions, when executed, define one or more recovery classes, wherein each recovery classes comprises at least one of the one or more recovery target sets; and saving the one or more recovery classes.

39. The computer accessible storage medium as recited in claim 38 wherein the instructions, when executed, select a first recovery class of the one or more recovery classes and apply the first recovery class to a first asset.

40. A computer system comprising the computer accessible storage medium as recited in claim 32 and a processor coupled to the computer accessible storage medium and configured to execute the plurality of instructions.

* * * * *